US010733236B1

(12) United States Patent
Parikh (10) Patent No.: US 10,733,236 B1
(45) Date of Patent: Aug. 4, 2020

(54) SYSTEMS AND METHODS FOR PRODUCING MESSAGE SEARCH RECOMMENDATIONS

(71) Applicant: Veritas Technologies LLC, Mountain View, CA (US)

(72) Inventor: Mirang Parikh, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 700 days.

(21) Appl. No.: 15/382,387

(22) Filed: Dec. 16, 2016

(51) Int. Cl.
*G06F 16/9032* (2019.01)
*G06F 16/25* (2019.01)

(52) U.S. Cl.
CPC ...... *G06F 16/90328* (2019.01); *G06F 16/252* (2019.01)

(58) Field of Classification Search
CPC .............. G06F 16/9535; G06F 16/338; G06F 16/24575
USPC ................................................. 707/767, 669
See application file for complete search history.

(56) References Cited

U.S. PATENT DOCUMENTS

| 6,493,703 | B1 * | 12/2002 | Knight ................. | G06Q 10/107 707/999.004 |
| 6,515,681 | B1 * | 2/2003 | Knight ................. | G06Q 10/107 707/999.003 |
| 7,085,806 | B1 * | 8/2006 | Shapira ................. | G06Q 30/08 705/1.1 |
| 7,844,668 | B2 * | 11/2010 | Canning ................. | H04L 67/32 709/206 |
| 8,548,997 | B1 * | 10/2013 | Wu ....................... | G06Q 10/103 707/736 |
| 2004/0133571 | A1 * | 7/2004 | Horne ................. | G06F 16/9535 707/999.003 |
| 2009/0030872 | A1 * | 1/2009 | Brezina ............. | G06F 16/24575 707/669 |
| 2011/0119593 | A1 * | 5/2011 | Jacobson ............... | G06Q 30/02 715/736 |

(Continued)

OTHER PUBLICATIONS

Veritas, Standard Enterprise Vault search properties, https://www.veritas.com/support/en_US/article.000075425, last accessed Sep. 26, 2016, Oct. 22, 2015.

(Continued)

*Primary Examiner* — Shahid A Alam
(74) *Attorney, Agent, or Firm* — FisherBroyles, LLP (57) ABSTRACT

The disclosed computer-implemented method for producing message search recommendations may include (i) providing a search bar for searching a corpus of network messages such that the search bar is configured to enable a user to search the network messages by specifying both a specialized keyword that designates a separate common field for searching the network messages and a value that corresponds to the separate common field, (ii) detecting, as the user types the specialized keyword, that the user is inputting the specialized keyword, and (iii) presenting, in response to detecting that the user is inputting the specialized keyword, a recommended different specialized keyword that has been used in conjunction with the detected specialized keyword in search queries rather than simply recommending a value that corresponds to the detected specialized keyword. Various other methods, systems, and computer-readable media are also disclosed.

20 Claims, 5 Drawing Sheets

(56) References Cited

U.S. PATENT DOCUMENTS

| | | | |
|---|---|---|---|
| 2012/0089681 A1* | 4/2012 | Chowdhury | H04L 12/6418 709/206 |
| 2014/0222780 A1* | 8/2014 | Wu | G06F 16/338 707/722 |
| 2016/0092475 A1* | 3/2016 | Stojanovic | G06F 16/211 707/805 |

OTHER PUBLICATIONS

Kraus, et al., Context-Sensitive Query Auto-Completion, http://www-scf.usc.edu/~csci572/papers/AutoCompletion.pdf, Irwin and Joan Jacobs Center for Communication and Information Technologies, Nov. 22, 2010.

\* cited by examiner

SYSTEMS AND METHODS FOR PRODUCING MESSAGE SEARCH RECOMMENDATIONS

BACKGROUND

Individuals and organizations typically seek to store and protect their valuable information. For example, enterprise organizations may establish automated backup systems to backup and secure information including confidential information, email messages, and/or intellectual property. To back up and secure this information, enterprise organizations may install and enable backup software that is configured to handle large quantities of data. Optionally, enterprise organizations may also hire a third-party data backup vendor to help backup and secure the data and/or store the data off-site.

Because the volume of stored data may be large, searching and managing the data may become challenging in some cases. Accordingly, backup software may provide for a search bar or search functionality to enable users to more conveniently locate and access records in the backed-up data. Nevertheless, the search functionality of some systems may still involve a user entering a long and complicated search string query repeatedly. Entering the search string query repeatedly may become cumbersome and prone to human error. The instant disclosure, therefore, identifies and addresses a need for systems and methods for producing message search recommendations.

SUMMARY

As will be described in greater detail below, the instant disclosure describes various systems and methods for producing message search recommendations. In one example, a computer-implemented method for producing message search recommendations may include (i) providing a search bar for searching a corpus of network messages such that the search bar is configured to enable a user to search the network messages by specifying both a specialized keyword that designates a separate common field for searching the network messages and a value that corresponds to the separate common field, (ii) detecting, as the user inputs the specialized keyword into the search bar, that the user is inputting the specialized keyword, and (iii) presenting, in response to detecting that the user is inputting the specialized keyword, a recommended different specialized keyword that, according to historical records, has been used in conjunction with the detected specialized keyword in search queries rather than simply recommending a value that corresponds to the detected specialized keyword.

In one embodiment, the network messages include emails. In further embodiments, the separate common fields include at least two of: (i) a sender field, (ii) a recipient field, and (iii) a subject field.

In one embodiment, the method further includes (i) detecting a pattern in the historical records that indicates that the detected specialized keyword has been used in conjunction with the recommended different specialized keyword, and (ii) linking the detected specialized keyword and the recommended different specialized keyword in a data structure to record the detected pattern. Additionally, in some examples, presenting the recommended different specialized keyword is based on the linking of the detected specialized keyword and the recommended different specialized keyword in the data structure.

In some examples, the computer-implemented method may further include presenting a recommended value that corresponds to the detected specialized keyword. In further examples, the computer-implemented method may further include presenting an additional recommended value that corresponds to the detected specialized keyword.

In some examples, the computer-implemented method may further include presenting a recommended value that corresponds to the recommended different specialized keyword. In some examples, presenting the recommended different specialized keyword is performed in a hierarchical manner that indicates the recommended different specialized keyword at a hierarchical level below the detected specialized keyword. In further examples, presenting the recommended value that corresponds to the recommended different specialized keyword is performed by expanding and revealing the recommended value in response to detecting selection of the recommended different specialized keyword.

In one embodiment, a system for implementing the above-described method may include (i) a provisioning module, stored in memory, that provides a search bar for searching a corpus of network messages such that the search bar is configured to enable a user to search the network messages by specifying both a specialized keyword that designates a separate common field for searching the network messages and a value that corresponds to the separate common field, (ii) a detection module, stored in memory, that detects, as the user inputs the specialized keyword into the search bar, that the user is inputting the specialized keyword, (iii) a presentation module, stored in memory, that presents, in response to detecting that the user is inputting the specialized keyword, a recommended different specialized keyword that, according to historical records, has been used in conjunction with the detected specialized keyword in search queries rather than simply recommending a value that corresponds to the detected specialized keyword, and (iv) at least one physical processor configured to execute the provisioning module, the detection module, and the presentation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) provide a search bar for searching a corpus of network messages such that the search bar is configured to enable a user to search the network messages by specifying both a specialized keyword that designates a separate common field for searching the network messages and a value that corresponds to the separate common field, (ii) detect, as the user inputs the specialized keyword into the search bar, that the user is inputting the specialized keyword, and (iii) present, in response to detecting that the user is inputting the specialized keyword, a recommended different specialized keyword that, according to historical records, has been used in conjunction with the detected specialized keyword in search queries rather than simply recommending a value that corresponds to the detected specialized keyword.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for producing message search recommendations. As described further below, the disclosed systems and methods may generally improve the speed, efficiency, and/or convenience of issuing search queries within a backup of network messages, such as emails. In general, the disclosed systems and methods may break the independence of search term recommendations for a specific keyword from other keywords. As one specific example, related systems may provide recommendations for values for a search keyword that a user has typed (e.g., "Joe" as the value for the search keyword "From:") without further recommending an additional search keyword that the user, or other users, has historically used together with the first search keyword. In contrast, the disclosed systems and methods may render recommendations for search keywords and/or values dependent on each other such that a user typing or entering one search keyword will also result in a recommendation for another search keyword. For example, the user typing the search keyword "from:" may result in a recommendation of the search keyword "to:" in the case that a user and/or different users has used these keywords together historically. The disclosed systems and methods may also similarly render search keyword value recommendations to be dependent on other entered search keywords and/or search keyword values, rather than independent, as further described above.

Figure 1:
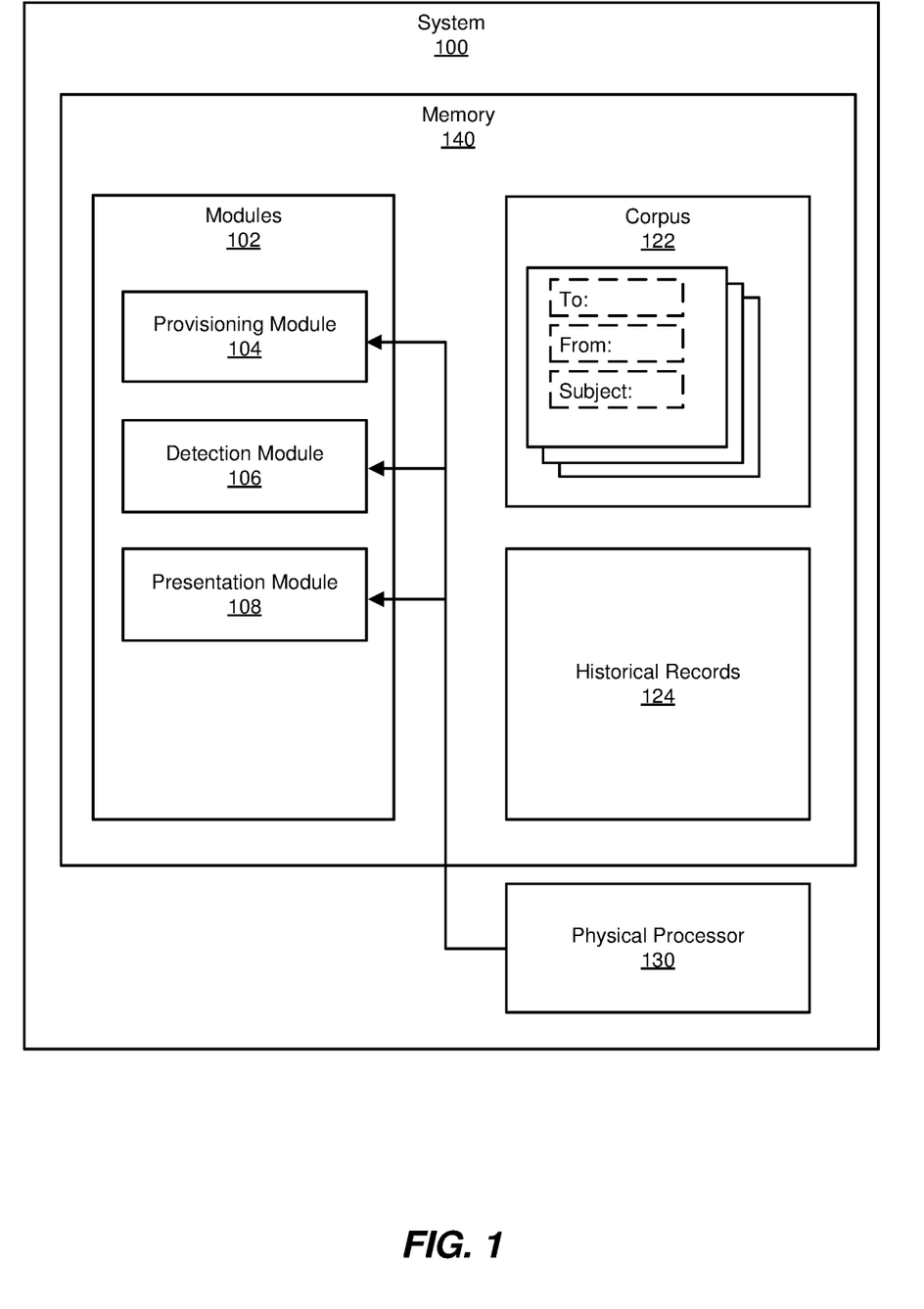
FIG. 1 is a block diagram of an example system for producing message search recommendations.
Figure 2:
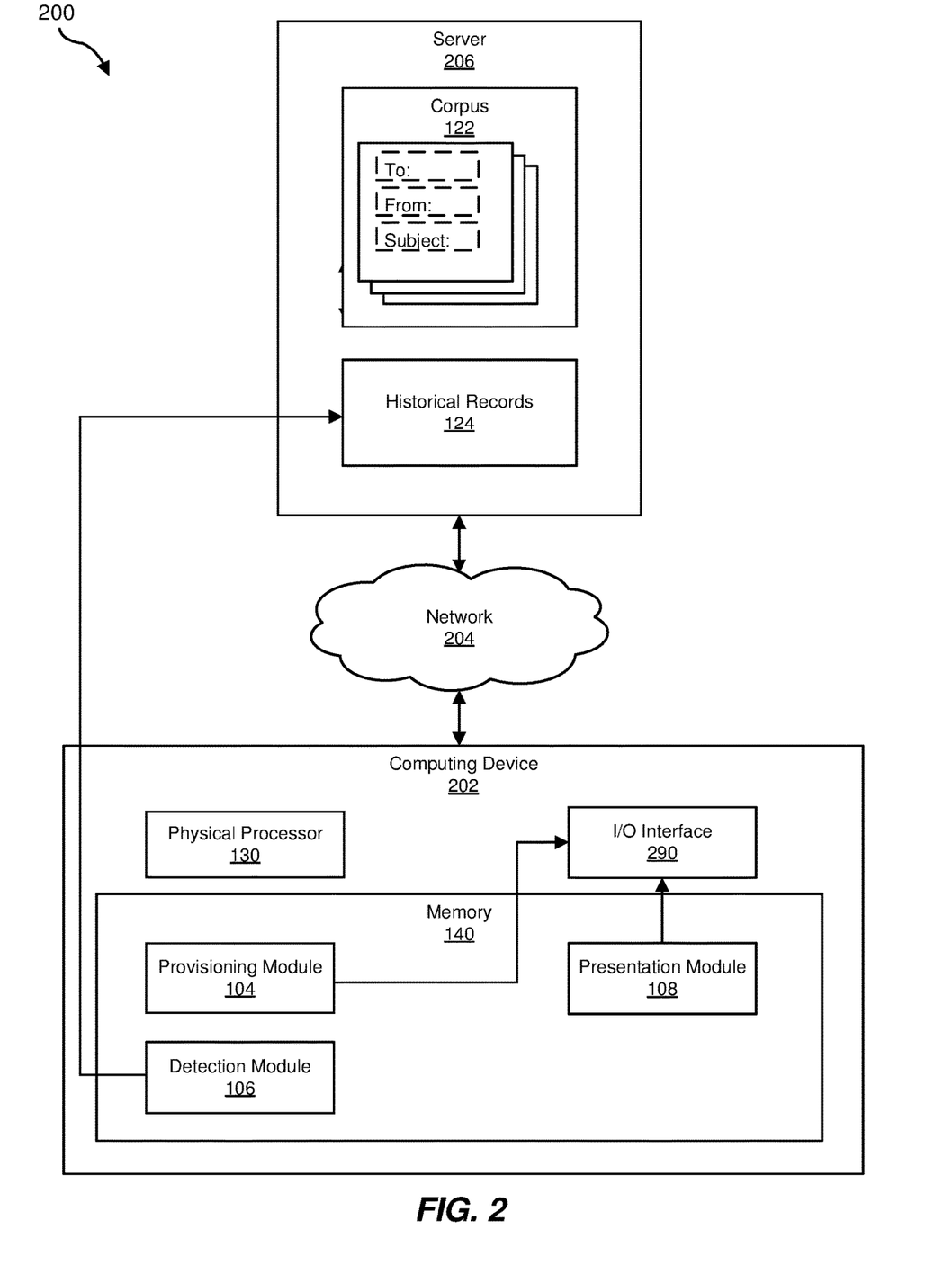
FIG. 2 is a block diagram of an additional example system for producing message search recommendations.

The following will provide, with reference to FIGS. 1-2, detailed descriptions of example systems for producing message search recommendations. Detailed descriptions of corresponding computer-implemented methods will also be provided in connection with FIGS. 3-5.

FIG. 1 is a block diagram of example system 100 for producing message search recommendations. As illustrated in this figure, example system 100 may include one or more modules 102 for performing one or more tasks. For example, and as will be explained in greater detail below, example system 100 may include a provisioning module 104 that provides a search bar for searching a corpus of network messages such that the search bar is configured to enable a user to search the network messages by specifying both a specialized keyword that designates a separate common field for searching the network messages and a value that corresponds to the separate common field. Example system 100 may additionally include a detection module 106 that detects, as the user inputs the specialized keyword into the search bar, that the user is inputting the specialized keyword. Example system 100 may also include a presentation module 108 that presents, in response to detecting that the user is inputting the specialized keyword, a recommended different specialized keyword that, according to historical records, has been used in conjunction with the detected specialized keyword in search queries rather than simply recommending a value that corresponds to the detected specialized keyword. In some examples, provisioning module 104, detection module 106, and/or presentation module 108 may interact with a user through an I/O interface 290, as further shown in FIG. 2. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory. As further shown in FIG. 1, memory 140 may also store a corpus 122 of network messages, as well as historical records 124, as further discussed below.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate producing message search recommendations. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to produce hierarchical message search recommendations.

Computing device 202 generally represents any type or form of computing device capable of reading computer-executable instructions. In one example, computing device 202 may also store a backup of the network message records and provide search functionality for searching the network message records in accordance with method 300, as described further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, or any other suitable computing device.

Server 206 generally represents any type or form of computing device that is capable of storing network message records and/or facilitating the performance of method 300, as described further below. Additional examples of server 206 include, without limitation, storage servers, database servers, application servers, and/or web servers configured to run certain software applications and/or provide various storage, database, and/or web services. Although illustrated as a single entity in FIG. 2, server 206 may include and/or represent a plurality of servers that work and/or operate in conjunction with one another. Notably, in the example of FIG. 2, corpus 122 and historical records 124 are stored on server 206, whereas one or more of modules 102 are stored on computing device 202. Nevertheless, in other examples, both these may be stored on a single one of server 206 and computing device 202, and method 300 may be performed on the single computing device, as discussed further below.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
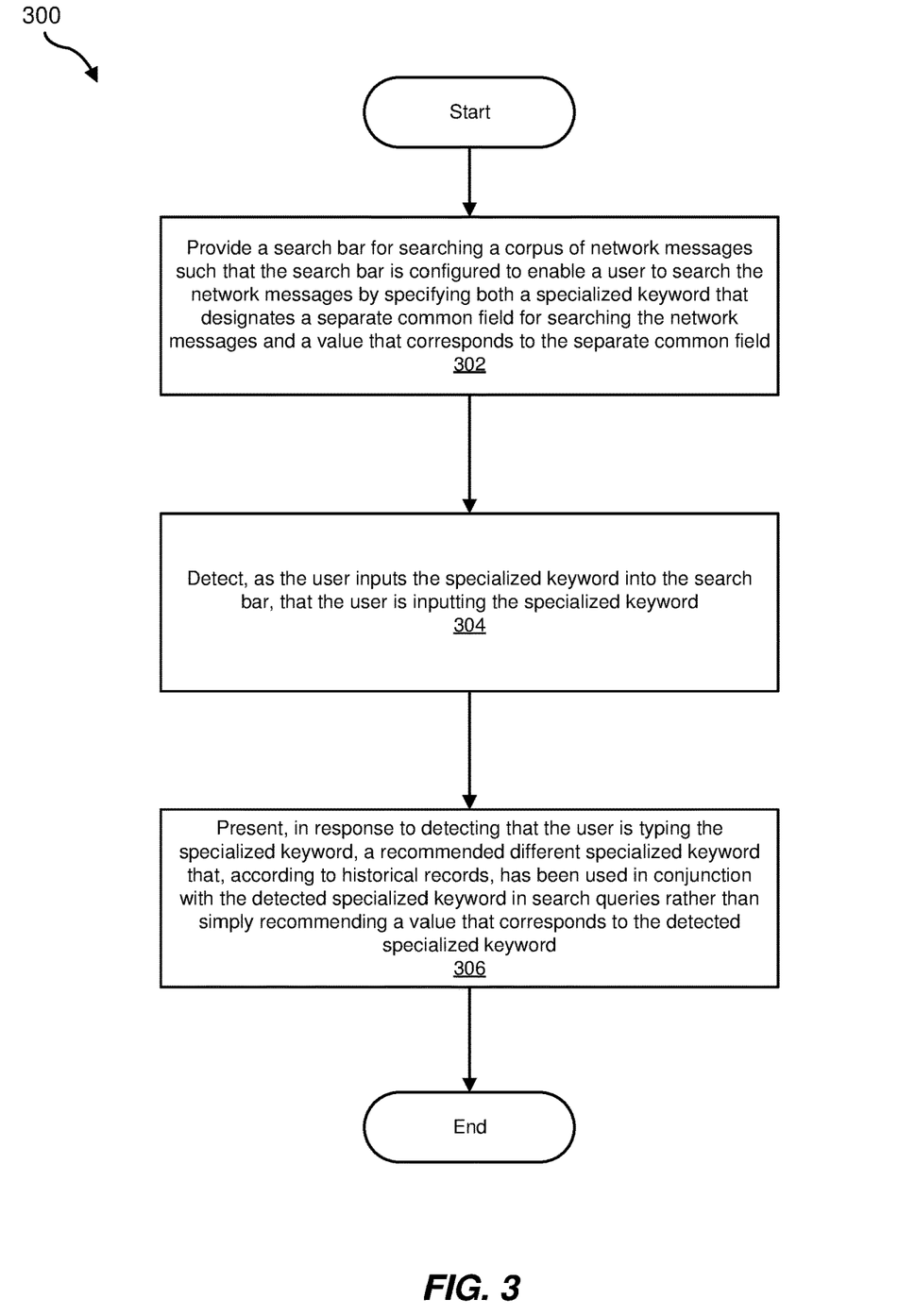
FIG. 3 is a flow diagram of an example method for producing message search recommendations.

FIG. 3 is a flow diagram of an example computer-implemented method 300 for producing message search recommendations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may provide a search bar for searching a corpus of network messages such that the search bar is configured to enable a user to search the network messages by specifying both a specialized keyword that designates a separate common field for searching the network messages and a value that corresponds to the separate common field. For example, provisioning module 104 may, as part of computing device 202 in FIG. 2, provide a search bar for searching a corpus of network messages such that the search bar is configured to enable the user to search network messages by specifying both a specialized keyword that designates a separate common field for searching the network messages and a value that corresponds to the separate common field.

As used herein, the term "corpus" generally refers to two or more network messages stored together within storage as a searchable group. Similarly, as used herein, the term "search bar" refers to an input interface that enables a user to input commands and/or search queries, as discussed further below. Additionally, as used herein, the term "specialized keyword" generally refers to any keyword that provides metadata, formatting, and/or instructions to a search engine such that the keyword designates information about how or where a corresponding value for the keyword is searched rather than searching for the keyword itself. For example, the specialized keyword "to:" designates that a value for the specialized keyword, such as "Joe" (in the example "to:'Joe'"), designates that the value "Joe" should be searched within the "to:" or recipient field of network messages, rather than searching for the keyword "to:" itself within the network messages. Similarly, the specialized keyword "subj:" designates that a value for the specialized keyword, such as "emergency" (in the example "subj:'emergency'"), designates that the value "emergency" should be searched within the "subj:" or subject field of network messages, rather than searching for the keyword "subj:" itself within the network messages.

Additionally, as used herein, the term "separate common field" generally refers to a field that corresponds to the specialized keyword. For example, the "to:" keyword corresponds to the recipient field of a network message. Similarly, the "subj:" keyword corresponds to the subject field of a network message. These fields may be "separate" in the sense that they are different and are specified separately in a search query (e.g., "subj:'emergency' AND to:'Joe'"). Moreover, the fields may be "common" in the sense that the fields correspond or apply to multiple network messages. For example, each email message will generally include both a subject field and a recipient field.

Notably, although some prominent fields may correspond to actual portions of network messages (e.g., the recipient field corresponds to a content portion that is literally inside of an email message), other fields may correspond to metadata or surrounding data that relates to the network messages without being stored literally inside of the network messages. For example, a "last accessed" field may indicate when a network message was last accessed in a storage system, rather than referring to any content that is literally contained within a network message. Similarly, a "folder" field may indicate where a network message is located within a storage system, rather than referring to any content that is literally contained within a network message. Moreover, as used herein, the term "user" generally refers to any entity that uses the search bar (e.g., regardless of whether the user corresponds to a human alone, a software program alone, or a human and software program in coordination with each other).

Provisioning module 104 may provide the search bar in a variety of ways. In general, provisioning module 104 may provide the search bar through an input/output interface, such as I/O interface 290. In some examples, the input/output interface may correspond to a visual display. In further examples, the search bar may correspond to a traditional search bar, such as those at GOOGLE.COM or provided by products like MICROSOFT OUTLOOK or VERITAS ENTERPRISE VAULT. A human user may enter a search query into the search bar by manually typing, by speaking through a dictation program, and/or any other suitable input mechanism.

In one embodiment, the network messages include emails. In further examples, the network messages may include any other message or package that is transmitted from one address to another address across a computer network. In some examples, the addresses may correspond to physical and/or virtual network addresses.

In one embodiment, the separate common fields include at least two of: (i) a sender field, (ii) a recipient field, and (iii) a subject field. In further examples, the separate common fields may include one or more of the following:

| Property | Type | Description |
| --- | --- | --- |
| adat | Date | The archived date in the range Jan. 1, 1970 through Jan. 1, 2038. |
| anum | Number | The attachment number. Specify 0 for the top-level item. |
| audn | String | The author's display/friendly name. |
| auea | String | The author's email address. |
| auot | String | The author's other email address. |
| ausm | String | The author's SMTP email address. Combines the values of properties wrsm, frsm, and ppsm. |
| auth | String | The author. |

-continued

| Property | Type | Description |
| --- | --- | --- |
| cnid | String | The conversation tracking identifier, expressed as a 32-character hexadecimal number. This is currently populated for MAPI and SMTP items only. |
| cpid | String | The ID of either an extension content provider instance or an Discovery Accelerator archiving task. |
| coid | String | The original identifier for this component of the item. |
| comr | String | The reason for missing content. The options are as follows:<br>0. No reason available.<br>1. Content does not exist.<br>2. Content could not be obtained.<br>3. Content is (or appears to be) corrupt.<br>4. Not possible to convert content to suitable format.<br>5. Conversion of content failed (converter error).<br>6. Conversion of content timed out.<br>7. Content requires conversion but its data format is excluded from conversion.<br>8. Content requires conversion but conversion bypass has been set.<br>9. Content is encrypted.<br>10. Content requires conversion but converters are not available, or have not been initialized.<br>11. Unable to add content to index.<br>12. Converters did not recognize the file type.<br>13. Conversion excluded for large files.<br>14. Conversion excluded for codepages we cannot detect. |
| cont | String | The content of the item (up to 120 characters). |
| crct | String | The current retention category identifier (up to 112 characters). |
| cupm | String | Truncated custom index properties. |
| date | Date | The created, sent, received, or archived date in the range Jan. 1, 1970 through Jan. 1, 2038. |
| dtyp | String | The data type of the item. For example, DOC, XLS, or MSG. |
| edat | Date | The expiry date for the item (based on the crct property), in the range Jan. 1, 1970 through Jan. 1, 2038. |
| fpcn | String | The content fingerprint of the item. Can be used to find a match on an attachment or document content. |
| fpdd | String | The deduplication fingerprint of the item. Can be used to find an exact match of a message or a document. Wildcard searches on this property are not supported. |
| frdn | String | FROM: Display/friendly name. |
| frea | String | FROM: Email address. Combines the values of properties frsm and frot. |
| from | String | The display/friendly name or email address. |
| frot | String | FROM: Other email address. |
| frsm | String | FROM: SMTP e-mail address. |
| iden | String | The original identifier for the item. For example, SubmissionId for a sent message. |
| impo | String | Message importance, expressed as a numeric value. 0 = Low, 1 = Normal, and 2 = High. |
| jaen | String | Message envelope: other author. |
| jrau | String | Message envelope: author. Only present for Exchange journal messages. The property values include both email addresses and display names, where present. |
| jrbc | String | Message envelope: BCC: recipient. |
| jrcc | String | Message envelope: CC: recipient. |
| jrcp | String | Message envelope: recipient. Only present for Exchange journal messages. The property values include both email addresses and display names, where present. |
| jren | String | Message envelope: other recipient. |
| jrfm | String | Message envelope: FROM: recipient. |
| jrpp | String | Message envelope: PP: recipient. |
| jrto | String | Message envelope: TO: recipient. |
| keys | String | Categories/keywords. |

-continued

| Property | Type | Description |
| --- | --- | --- |
| locn | String | The original location of the item. A sequence of folders. |
| mdat | Date | The last-modified date of the item in the range Jan. 1, 1970 through Jan. 1, 2038. |
| msgc | String | The item's original MAPI message class (for example, IPM.Note). |
| nadn | String | Name. Display/friendly name. Combines the values of properties redn and audn. |
| naea | String | Name. Exchange email address. Combines the values of properties reea and auea. |
| name | String | The display/friendly name or email address of the message author or recipient. |
| naot | String | Name. Other email address. Combines the values of properties reot and auot. |
| nasm | String | Name. SMTP email address. Combines the values of properties resm and ausm. |
| natc | Number | The number of attachments. |
| ndte | Number | The number of days to expiry for the item (based on the current retention category identifier). |
| nrcp | Number | The number of recipients. |
| ppdn | String | PP. Display/friendly name. |
| ppea | String | PP. Exchange email address. Combines the values of properties ppsm and ppot. |
| ppgn | String | The display/friendly name or email address of the person on whose behalf a document has been written or a message has been sent. |
| ppot | String | PP. Other email address. |
| ppsm | String | PP. SMTP email address. |
| prio | String | The message priority, expressed as a numeric value. −1 = Low, 0 = Normal, and 1 = High. |
| pvid | String | The permission VaultIds for the item (up to 112 characters). |
| rbcc | String | BCC: recipient. |
| rbdn | String | BCC: recipient. Display/friendly name. |
| rbea | String | BCC: recipient. Email address. Combines the values of properties rbsm and rbot. |
| rbot | String | BCC: recipient. Other email address. |
| rbsm | String | BCC: recipient. SMTP email address. |
| rcat | String | The original retention category identifier (up to 112 characters). |
| rcdn | String | CC: recipient. Display/friendly name. |
| rcea | String | CC: recipient. Email address. Combines the values of properties rcsm and rcot. |
| rcot | String | CC: recipient. Other email address. |
| rcsm | String | CC: recipient. SMTP email address. |
| rccc | String | CC: recipient. |
| recp | String | The display/friendly name or email address of the message recipient. |
| redn | String | Message recipient. Display/friendly name. Combines the values of properties rtdn, rcdn, rbdn, and rndn. |
| reea | String | Message recipient. Email address. Combines the values of properties rtea, rcea, rbea, and rnea. |
| reot | String | Message recipient. Other email address. Combines the values of properties rtot, rcot, rbot, and rnot. |
| resm | String | Message recipient. SMTP email address. Combines the values of properties rtsm, rcsm, rbsm, and rnsm. |
| reto | String | TO: recipient. |
| rndn | String | Other envelope recipient. Display/friendly name. |
| rnea | String | Other envelope recipient. Email address. Combines the values of properties rnsm and rnot. |
| rnot | String | Other envelope recipient. Other email address. |
| rnsm | String | Other envelope recipient. SMTP email address. |
| rtdn | String | TO: recipient. Display/friendly name. |
| rtea | String | TO: recipient. Email address. Combines the values of properties rtsm and rtot. |
| rtot | String | TO: recipient. Other email address. |
| rtsm | String | TO: recipient. SMTP email address. |
| sens | String | Message sensitivity, expressed as a numeric value. 0 = Normal, 1 = Personal, 2 = Private, and 3 = Confidential. |
| size | Number | The size of the item in KB. |
| snum | Number | The index sequence number, expressed as a 64-bit integer. |
| ssid | String | The saveset identifier of the item. Maximum of 72 characters. Wildcard searches on this property are not supported. |
| subj | String | The subject/title. |
| text | String | The content of the item (cont) or its subject/title (subj). |
| wrdn | String | Writer. Display/friendly name. |
| wrea | String | Writer. Email address. Combines the values of properties wrsm and wrot. |
| writ | String | Writer. Combines the values of properties wrdn, wrea, wrsm, and wrot. |
| wrot | String | Writer. Other email address. |
| wrsm | String | Writer. SMTP email address. |

At step 304, one or more of the systems described herein may detect, as the user inputs the specialized keyword into the search bar, that the user is inputting the specialized keyword. For example, detection module 106 may, as part of computing device 202 in FIG. 2, detect, as the user inputs the specialized keyword into the search bar, that the user is inputting the specialized keyword.

As used herein, the phrase "as the user is inputting the specialized keyword" generally refers to the user either being in the middle of the process of inputting the specialized keyword or just completing inputting the specialized keyword. For example, detection module 106 may detect that the user is inputting the specialized keyword "subj:" in response to the user typing "su", "subj", and/or "subj:". In general, detection module 106 may scan characters or commands that are inputted by the user for a partial or full string that corresponds to a specialized keyword, thereby triggering detection of the specialized keyword. Notably, in some examples detection module 106 may attempt to predict that a user is inputting a specialized keyword prior to completion of the process of inputting the specialized keyword. For example, detection module 106 may detect that the user is inputting the specialized keyword "subj:" in response to the user having typed "sub" before the user completes the process of typing "subj:" or typing "subj:'emergency'" (where "emergency" is the value in this example that corresponds to the designated keyword for the subject field of the network message).

In some examples, detection module 106 may perform the scan for the partial or full string that corresponds to a specialized keyword continuously as the user inputs or types a search query. In other examples, detection module 106 may perform the scan periodically or at irregular times during the process of typing the search query At step 306, one or more of the systems described herein may present, in response to detecting that the user is inputting the specialized keyword, a recommended different specialized keyword that, according to historical records, has been used in conjunction with the detected specialized keyword in search queries rather than simply recommending a value that corresponds to the detected specialized keyword. For example, presentation module 108 may, as part of computing device 202 in FIG. 2, present, in response to detecting that the user is typing the specialized keyword, a recommended different specialized keyword that, according to historical records, has been used in conjunction with the detected specialized keyword in search queries rather than simply recommending a value that corresponds to the detected specialized keyword.

As used herein, the phrase "present a recommended different specialized keyword" generally refers to outputting a prompt or recommendation that specifies a different specialized keyword than the specialized keyword detected at step 304, as described further above. In the example of a visual prompt, the visual prompt may be displayed beneath or adjacent the search bar, or otherwise displayed in a manner that conveniently provides the recommendation for the benefit of the user while inputting and finalizing a search query. Additionally, as used herein, the phrase "rather than simply recommending a value that corresponds to the detected specialized keyword" generally refers to presentation module 108 presenting a recommendation that is more and/or different than simply, or just, a recommendation of a value that corresponds to the specialized keyword detected at step 304. In other words, the phrase "rather than simply recommending a value that corresponds to the detected specialized keyword" generally refers to presentation module 108 presenting a recommendation that is more and/or different than the independent keyword value recommendation process shown in FIG. 4, as further discussed below.

Figure 4:
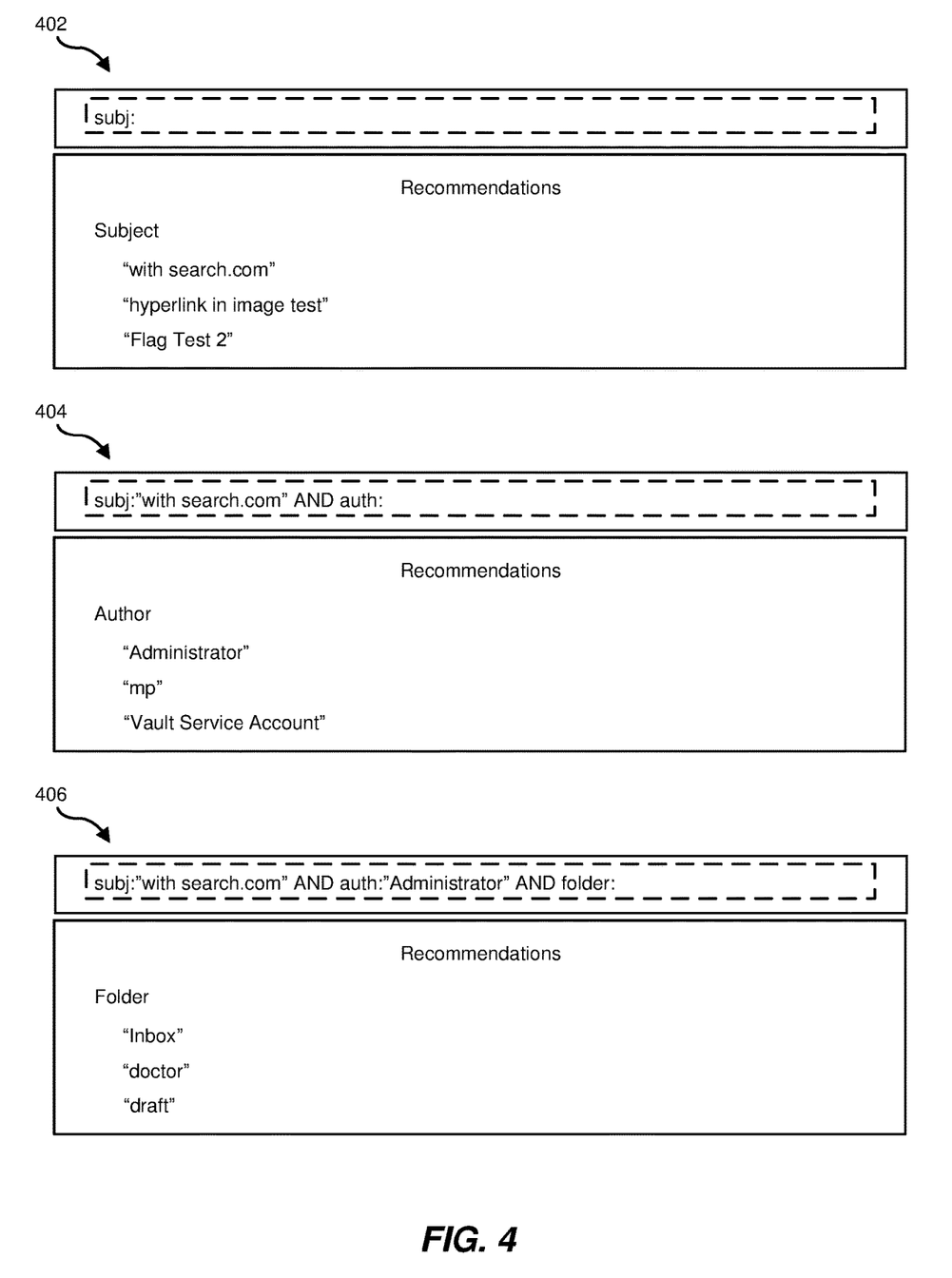
FIG. 4 is a block diagram of example network message search query recommendations.

FIG. 4 shows an example of a related recommendation system that merely provides an independent keyword value recommendation and, therefore, suffers from one or more problems or inefficiencies that are solved, or improved upon, by method 300. More specifically, FIG. 4 shows a search bar and corresponding search functionality that provides value recommendations in response to detecting a specialized keyword. For example, in example 402, the keyword again "subj:" has been detected, triggering recommendations for the corresponding "subject" field of network messages, and further triggering the specific keyword value recommendations "with search.com", "hyperlink in image test", and "Flag Test 2".

In these examples, the user in example 402 may have selected the recommendation for the value "with search.com" thereby completing the subject portion of the search query, as further shown in subsequent example 404. In this subsequent example, the search query now states "subj:'with search.com' AND auth:". Accordingly, in the subsequent example, the subject portion of the search query has been completed and a different specialized keyword has been detected. In this case, the different specialized keyword is "auth", which corresponds to the author of a network message. Accordingly, detection of the different specialized keyword has triggered recommendations for the corresponding "author" field of the network messages, and further triggered specific keyword value recommendations "Administrator", "mp", and "Vault Service Account." The reader may readily observe that the same process continues, in a parallel manner, with respect to the next subsequent example 406, which is shown at the bottom of FIG. 4.

The examples 402, 404, and 406 of FIG. 4 show a search query recommendation process that (1) only provides recommended values for detected specialized keywords such that (2) the recommended values are independent of each other and based only on the detection of the corresponding specialized keyword without any context relating to other specialized keywords within the search query. In other words, in example 404, the recommended values for the author field and corresponding specialized keyword are based merely on detection of the author specialized keyword without being further based on detection of the subject specialized keyword (in example 402) and/or subsequent detection of the folder specialized keyword (in example 406). Additionally, the recommendation process shown in FIG. 4 merely recommends values for detected specialized keywords without further recommending additional and/or different specialized keywords. The recommendation process shown in FIG. 4 fails to recommend additional and/or different specialized keywords even if two or more specialized keywords have been used repeatedly by the same user, or different users, in a repeated and cumbersome manual process.

Figure 5:
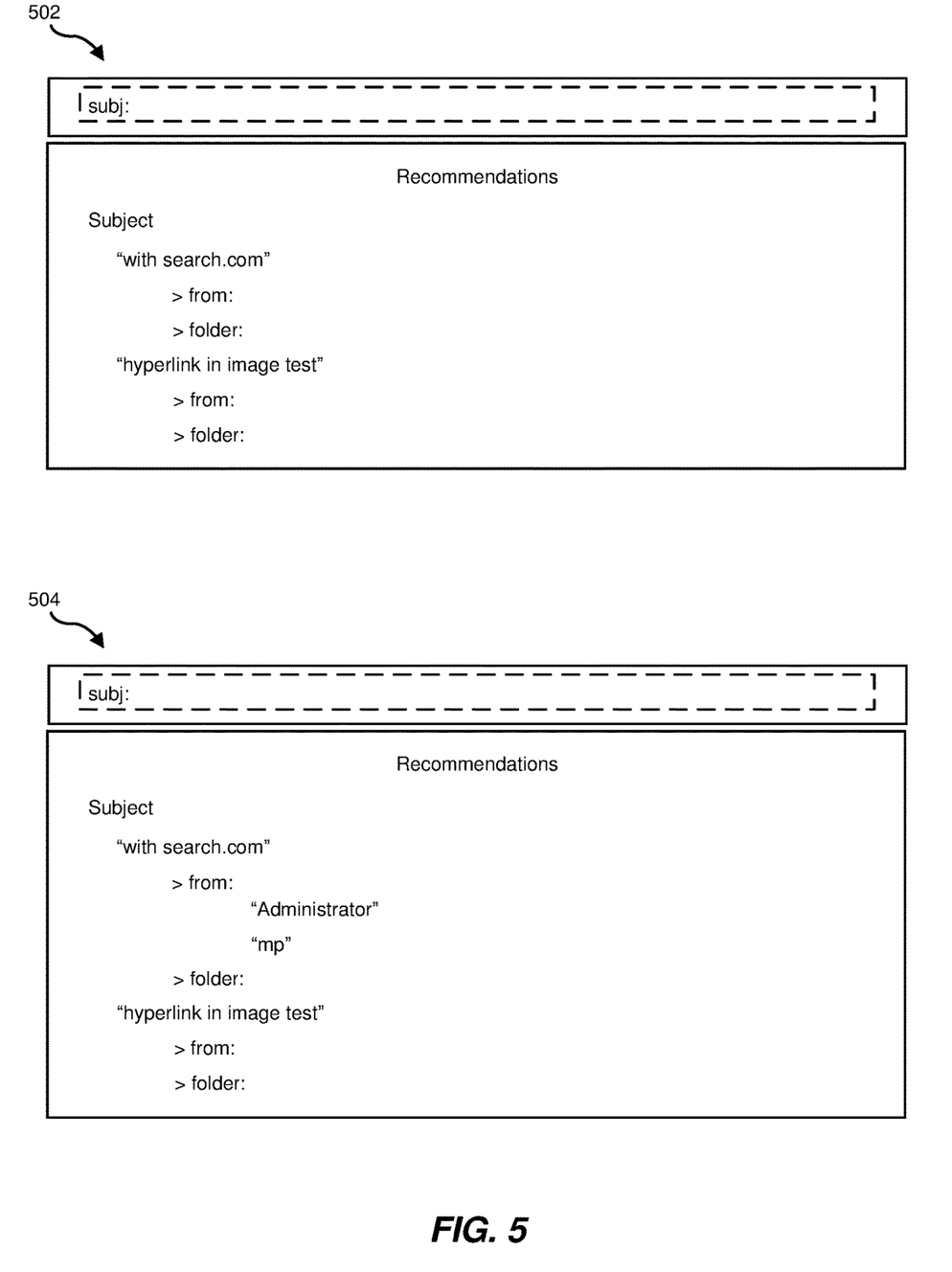
FIG. 5 is a block diagram of further example network message search query recommendations.

Presentation module 108 may present the recommended different specialized keyword in a variety of ways. FIG. 5 shows examples of how presentation module 108 may present the recommended different specialized keyword, in accordance with method 300, and a manner that improves upon the recommendation process shown in FIG. 4. As shown, this figure includes an example 502 and a subsequent example 504. As further shown in this figure, at example 502, detection of the subject specialized keyword (e.g., at step 304 of method 300) may thereby trigger presentation, by presentation module 108, at step 306, of a different specialized keyword. More specifically, in example 502, detection of the subject specialized keyword further triggers recommendation of both the "from:" and the "folder:" specialized keywords. Notably, in this example, the "from:" and the "folder:" specialized keywords are recommended in addition to recommending specific values for the previously detected "subj:" specialized keyword (i.e., the recommended specific values "with search.com" and "hyperlink in image test", as further shown in FIG. 5 at example 502).

In other words, the recommendation process shown in FIG. 5, at example 502, may improve upon the recommendation process of FIG. 4 by eliminating the need for the user to repeatedly, and cumbersomely, retype the "from:" and/or the "folder:" specialized keywords when historical records indicate that two or more of these specialized keywords have been used in conjunction with each other in the past according to a pattern. The related recommendation process of FIG. 4 cannot provide this efficiency improvement, because the related recommendation process of FIG. 4 does not recommend different specialized keywords at all, and does not consider the context of statistically related different specialized keywords when providing recommendations for values corresponding to a detected specialized keyword, as further described above.

In some examples, one or more of modules 102 may reference historical records of network messages, detected patterns within the historical records, and/or a data structure that includes or specifies the historical records or the detected pattern(s), during the performance of method 300. For example, in one embodiment, the method further includes (i) detecting a pattern in the historical records that indicates that the detected specialized keyword has been used in conjunction with the recommended different specialized keyword. Moreover, the method may also include (ii) linking the detected specialized keyword and the recommended different specialized keyword in a data structure to record the detected pattern. In some examples, the data structure may record the conjunction, linking, and/or association between two specialized keywords after a single instance of a search query (e.g., that has been typed, finalized, and/or executed) that includes both of the specialized keywords. In other examples, the data structure may record the conjunction, linking, and/or association between the two specialized keywords only after a quantity, proportion, and/or frequency of search queries includes both of the specialized keywords, thereby indicating a pattern or statistical association. In general, detection module 106 may detect the pattern of conjunction between two specialized keywords according to any suitable statistical measurement and/or corresponding threshold cutoff. Accordingly, in some examples, presentation module 108 may present the recommended different specialized keyword based on the linking of the detected specialized keyword and the recommended different specialized keyword in the data structure.

Additionally, in further examples, presentation module 108 may additionally present a recommended value that corresponds to the detected specialized keyword. In the example of FIG. 5, at example 502, presentation module 108 may present "with search.com" and "hyperlink in image test" as candidate recommended values for the subject specialized keyword, in addition to recommending both "from:" and "folder:" as recommended different specialized keywords, as further described above in accordance with step 306 of method 300.

Additionally, in some examples, presentation module 108 may further present an additional recommended value that corresponds to the detected specialized keyword. As further described above, the additional recommended values of "with search.com" and "hyperlink in image test", as shown in example 502 of FIG. 5, both correspond to the detected subject specialized keyword.

In additional examples, presentation module 108 may present a recommended value that corresponds to the recommended different specialized keyword. Returning to FIG. 5, at example 504, presentation module 108 may further recommend, as specific values for the corresponding specialized keyword "from:", both "Administrator" and "mp". In this example, the recommended specific values correspond to the recommended different specialized keyword "from:", which has been displayed in response to detection of the original specialized keyword "subj:", as further described above. Accordingly, presentation module 108 may recommend both the different specialized keyword (e.g., "from:") as well as one or more specific values that correspond to the different specialized keyword.

In additional examples, presentation module 108 may present the recommended different specialized keyword in a hierarchical manner that indicates the recommended different specialized keyword at a hierarchical level below the detected specialized keyword. As illustrated in FIG. 5, in example 504, presentation module 108 has presented the different specialized keyword "from:" in a visual display, or other manner, that indicates that the recommended different specialized keyword "from:" is located at a hierarchical level below the detected specialized keyword "subj:". In this specific example, presentation module 108 presents the recommended different specialized keyword in the hierarchical manner by indenting the visual recommendation for the different specialized keyword with respect to the original detected specialized keyword. In additional or alternative examples, presentation module 108 may indicate the hierarchical relationship using arrows, font sizes, line ordering, and/or any other suitable visual or other indication of a hierarchical relationship.

Notably, in example 504, the recommended specific values "with search.com" and "hyperlink in image test", which both correspond to the detected subject specialized keyword, is further embedded within the indicated hierarchy, at a level that is located in between the original detected specialized keyword (e.g., "subj:") and the recommended different specialized keyword (e.g., "from:"). Similarly, in example 504, the recommended specific values "Administrator" and "mp", which both correspond to the recommended different specialized keyword (e.g., "from:"), are further embedded within the indicated hierarchy, at a level that is located below the recommended different specialized keyword (e.g., at the bottom of the specific example hierarchy). Moreover, in example 504, recommended specific values are displayed for the "from:" keyword but not for the "folder:" keyword. Nevertheless, in additional or alternative examples, recommended specific values may be displayed for both or all of the recommended different specialized keywords rather than just one of the recommended different specialized keywords.

Additionally, in some examples, presentation module 108 may present the recommended value that corresponds to the recommended different specialized keyword by expanding and revealing the recommended value in response to detecting selection of the recommended different specialized keyword. In example 504, presentation module 108 may expand and reveal the recommended specific values "Administrator" and/or "mp" for the recommended different specialized keyword "from:" in response to detecting selection of the recommended different specialized keyword "from:". In these examples, presentation module 108 may present the specific recommended values for just the "from:" specialized keyword or for both the "from:" specialized keyword and the "folder:" specialized keyword. Additionally, when presenting specific recommended values for both the "from:" and the "folder:" specialized keywords, presentation module 108 may present these recommended values underneath just the "search.com" recommended value or underneath both the "search.com" recommended value and the "hyperlink in image test" recommended value. In general, selection of one or more commands, prompts, buttons, settings, specialized keywords, and/or recommended specific values, may trigger presentation of one or more further recommended specific values for corresponding recommended different specialized keywords. Moreover, the process of hiding, concealing, and/or omitting one or more recommended specific values, as discussed above, and then revealing and expanding one or more of these recommended specific values in response to a user selection, may render the search bar and searching process more manageable and easy to understand, especially in the case of a large number of specialized keywords and/or recommended specific values for the specialized keywords.

In general, selection of a recommended different specialized keyword will populate the search query under construction with that specialized keyword, and selection of a specific recommended value for a corresponding recommended different specialized keyword will populate the search query under construction with both the specific recommended value and also the corresponding recommended different specialized keyword. In some examples, recommended different specialized keywords may be linked together such that selection of one or both of the recommended different specialized keywords will simultaneously populate the search query under construction with both of the additional different specialized keywords (e.g., after typing "subj:" the system may recommend both "from:" and "folder:" and the user may populate the search query under construction with both of these recommended different specialized keywords by selecting one of them. In a further example, one or both of these additional recommended different specialized keywords may be displayed with a corresponding recommended specific value, and selection of one or both of these recommended different specialized keywords, and/or a recommended specific value, may populate the search query under construction with both of the recommended different specialized keywords as well as the corresponding recommended specific value(s). In other examples, each recommended specialized keyword, or each recommended specialized keyword and recommended value pair, must be selected individually.

Additionally, in the example of FIG. 5, the recommended different specialized keywords for the recommended specific values "with search.com" and "hyperlink in image test" are the same (i.e., the "from:" and "folder:" specialized keywords). Nevertheless, in other examples, the recommended different specialized keywords may differ between recommended specific values depending on each specific value and the pattern of previous search queries within the historical records.

The above discussion provides a general overview of the disclosed systems and methods in accordance with method 300 of FIG. 3. Additionally, the following discussion provides a more specific and detailed overview of embodiments of the disclosed systems and methods.

The disclosed subject matter relates to syntactically remembering the query language pattern (e.g., keywords in the search criteria) frequently used by a user and then presenting that information in a hierarchical fashion as suggestions to the user. There are related applications which provide suggestions when the user starts typing in the search textbox. These are suggestions which are displayed based on historical searches performed by the user. The suggestions provided to the user are mostly specific to the keyword (such as subject, author, folder, etc.) either explicitly or implicitly. Even though a user regularly uses the same keywords to perform searches, there is no context between the suggestions displayed to the user.

For example, a user may use "MAIL APP" on a MAC computing system. In that application, the user may regularly search using criteria like "subject" and "from." Every time the user wants to search for items, the user has to type something like "subject:fixed AND from:eric". Even if the user performs the searches using the same pattern, suggestions are displayed independently and there is no hierarchy that maintains the context between suggestions displayed. A similar situation may occur in some versions of VERITAS ENTERPRISE VAULT.

One goal of the disclosed systems and methods is to track the pattern of keywords that the user uses to perform searches and then present them in a hierarchical fashion while maintaining the context between different specialized keywords. For example, a user may perform a search regularly using the specialized keywords subject AND author AND folder. So, for example, when any record's subject is stored in a suggestion, the disclosed systems and methods may also ensure that additional attributes, such as author and folder, are further stored along as metadata of that suggestion. Accordingly, when the user starts typing anything, and if the text matches the subject stored in the suggestion, the disclosed systems and methods will display the subject as a suggestion, and will additionally display, below that in a hierarchy, the suggestions for author and folder. This way the user can quickly and accurately get to what the user is looking for.

In one example, the hierarchy is displayed when the user enters a subject. As the pattern that the user regularly used, was "from" and "folder", those specialized keywords are displayed as a hierarchy below each subject (as further shown in FIG. 5). Additionally, from the hierarchy the user can expand "from" or "folder" and select a suggestion from each of them. These values will be related to the subject, thereby breaking the independence between recommended values for different specialized keywords in related systems, as described above. Selecting one or more recommended values will result in the recommended values being populated into the search query under construction in the search bar.

In some examples, the suggestions are stored and displayed based on the items that the user accesses. So once the user accesses any item, the disclosed systems and methods will maintain a dictionary of the keywords such as "from," "folder," "subject," "size," etc. The dictionary will be updated with metadata of the item that the user accessed. The keys for all these dictionaries would be the item ID or ID number, which will be unique.

Additionally, the disclosed systems and methods may reference a "pattern" data structure, which will store whether there is any pattern that has been identified as a common pattern for a user. The disclosed systems and methods will also maintain a list of distinct keywords that the user is using as search criteria. If that set of keywords is repeated across multiple criteria, then we will update the pattern data structure accordingly. So now if the user starts inputting any subject in the search box and that subject keyword is in the pattern data structure, and if the subject is matching from the suggestions list, then based on the pattern data structure the hierarchy metadata is also displayed, as a hierarchy, under that suggestion. Accordingly, the user will see the hierarchy of suggestions that are in the same context and can allow the user to quickly reach a desired search query result.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for producing message search recommendations, at least a portion of the method being performed by a computing device comprising at least one processor, the method comprising:
   providing a search bar for searching a corpus of network messages such that the search bar is configured to enable a user to search the network messages by specifying both a specialized keyword that designates a separate common field for searching the network messages and a value that corresponds to the separate common field;
   detecting, as the user inputs the specialized keyword into the search bar, that the user is inputting the specialized keyword;
   presenting, in response to detecting that the user is inputting the specialized keyword, a recommended different specialized keyword that, according to historical records, has been used in conjunction with the detected specialized keyword in search queries rather than simply recommending a value that corresponds to the detected specialized keyword;
   detecting a pattern in the historical records that indicates that the detected specialized keyword has been used in conjunction with the recommended different specialized keyword; and
   linking the detected specialized keyword and the recommended different specialized keyword in a data structure to record the detected pattern.

2. The computer-implemented method of claim 1, wherein the network messages comprise emails.

3. The computer-implemented method of claim 1, wherein the separate common field comprises at least one of:
   a sender field; and
   a recipient field.

4. The computer-implemented method of claim 1, wherein the separate common field comprises a subject field.

5. The computer-implemented method of claim 1, wherein presenting the recommended different specialized keyword is based on the linking of the detected specialized keyword and the recommended different specialized keyword in the data structure.

6. The computer-implemented method of claim 1, further comprising presenting a recommended value that corresponds to the detected specialized keyword.

7. The computer-implemented method of claim 6, further comprising presenting an additional recommended value that corresponds to the detected specialized keyword.

8. The computer-implemented method of claim 6, further comprising presenting a recommended value that corresponds to the recommended different specialized keyword.

9. The computer-implemented method of claim 8, wherein presenting the recommended value that corresponds to the recommended different specialized keyword is performed by expanding and revealing the recommended value in response to detecting selection of the recommended different specialized keyword.

10. The computer-implemented method of claim 1, wherein presenting the recommended different specialized keyword is performed in a hierarchical manner that indicates the recommended different specialized keyword at a hierarchical level below the detected specialized keyword.

11. A system for producing message search recommendations, the system comprising:
- a provisioning module, stored in memory, that provides a search bar for searching a corpus of network messages such that the search bar is configured to enable a user to search the network messages by specifying both a specialized keyword that designates a separate common field for searching the network messages and a value that corresponds to the separate common field;
- a detection module, stored in memory, that detects, as the user inputs the specialized keyword into the search bar, that the user is inputting the specialized keyword;
- a presentation module, stored in memory, that presents, in response to detecting that the user is inputting the specialized keyword, a recommended different specialized keyword that, according to historical records, has been used in conjunction with the detected specialized keyword in search queries rather than simply recommending a value that corresponds to the detected specialized keyword; and
- at least one physical processor configured to execute the provisioning module, the detection module, and the presentation module;
- wherein the presentation module is further configured to:
  - detect a pattern in the historical records that indicates that the detected specialized keyword has been used in conjunction with the recommended different specialized keyword; and
  - link the detected specialized keyword and the recommended different specialized keyword in a data structure to record the detected pattern.

12. The system of claim 11, wherein the network messages comprise emails.

13. The system of claim 11, wherein the separate common field comprises at least one of:
- a sender field; and
- a recipient field.

14. The system of claim 11, wherein the separate common field comprises a subject field.

15. The system of claim 11, wherein the presentation module presents the recommended different specialized keyword based on the linking of the detected specialized keyword and the recommended different specialized keyword in the data structure.

16. The system of claim 11, wherein the presentation module presents a recommended value that corresponds to the detected specialized keyword.

17. The system of claim 16, wherein the presentation module presents an additional recommended value that corresponds to the detected specialized keyword.

18. The system of claim 16, wherein the presentation module presents a recommended value that corresponds to the recommended different specialized keyword.

19. The system of claim 11, wherein the presentation module presents the recommended different specialized keyword in a hierarchical manner that indicates the recommended different specialized keyword at a hierarchical level below the detected specialized keyword.

20. A non-transitory computer-readable medium comprising one or more computer-readable instructions that, when executed by at least one processor of a computing device, cause the computing device to:
- provide a search bar for searching a corpus of network messages such that the search bar is configured to enable a user to search the network messages by specifying both a specialized keyword that designates a separate common field for searching the network messages and a value that corresponds to the separate common field;
- detect, as the user inputs the specialized keyword into the search bar, that the user is inputting the specialized keyword;
- present, in response to detecting that the user is inputting the specialized keyword, a recommended different specialized keyword that, according to historical records, has been used in conjunction with the detected specialized keyword in search queries rather than simply recommending a value that corresponds to the detected specialized keyword;
- detect a pattern in the historical records that indicates that the detected specialized keyword has been used in conjunction with the recommended different specialized keyword; and
- link the detected specialized keyword and the recommended different specialized keyword in a data structure to record the detected pattern.

* * * * *